Patented July 3, 1934

1,965,392

UNITED STATES PATENT OFFICE 1,965,392

FRACTIONATING MIXTURES OF HYDROCARBONS AND THEIR DERIVATIVES

John Ward Poole, Jaffrey, N. H.

No Drawing. Application April 21, 1932,
Serial No. 606,763

15 Claims. (Cl. 196—13)

This invention relates to improvements in methods for separating an undesirable mixture of hydrocarbons and/or their derivatives, to produce other mixtures certain or all of which are of greater purity and of greater utility.

More particularly the invention relates to the separation of natural crude oils or synthetic oils by a solvent or extraction method into mixtures of hydrocarbons and/or their derivatives, certain or all of which are of greater purity and of greater utility.

Still more specifically the invention relates to solvent methods for separating or extracting superior lubricating oils from crude oils, such as natural petroleum, or from synthetic oils, such as those produced by hydrogenation of coal and the like.

The raw material, such as crude petroleum, etc., which is treated by the process embodying the present invention, is fundamentally a mixture of hydrocarbons and/or their derivatives, which, due to the complexity of its composition, is of less value than it would be if reduced to two or more fractions of less complexity; in other words, two or more fractions each of which is richer in certain compounds or classes of compounds than was the original mixture.

At the present time the greatest source of such material is petroleum. Of minor importance are such mixtures as are obtained from the carbonization of coal, from hydrogenation processes, certain fermentation processes, etc.

As these mixtures are encountered commercially they are found to be widely variant, consisting in many cases of hundreds and probably thousands of compounds, the relative proportions of each varying more or less independently of any or all of the others. This variation is so great that the composition of petroleum produced from certain wells may be obviously different from that produced in a nearby field or even from an adjacent well, and is usually greatly different from that produced from a well in a remote district. As examples may be cited the petroleum produced in the so-called Pennsylvania field and that produced in a typical California area, in which the oil produced in the Pennsylvania field is of greater purity in respect to high hydrogen-carbon ratio of compounds, such as paraffin, while petroleums produced in California and Mexico are of greater purity in respect to asphaltic compounds and low hydrogen carbon ratio compounds. The former, in general, will contain in combination a relatively greater amount of hydrogen than will the latter. Also they will probably differ in relative amounts of such hydrocarbon derivatives as contain sulphur, nitrogen, and/or oxygen. On the other hand, neither will consist solely of one compound nor of one class of compounds.

In most cases they may be expected to and do contain certain compounds, or classes of compounds, in common. Possibly their outstanding differences may be attributed less to different components than to different proportions of the same substances, or classes of substances. But irrespective of this distinction, however, each so-called petroleum will contain compounds which differ in hydrogen carbon (H—C) ratio. As an illustration, petroleum may contain paraffins, one of which would have the formula $C_{30}H_{62}$ possessing an H—C ratio of 62/30. It may contain a saturated compound, for example, $C_{30}H_{60}$, structurally explained as possessing a closed carbon chain with one or more long aliphatic side chains. It may possess saturated compounds of multiple rings condensed, or separated, and for each ring contained it will contain two less hydrogen atoms per molecule than would another saturated compound containing the same number carbon atoms per molecule, but lacking the ring or rings above described. Such petroleum might also comprise constituents possessing aromatic or benzene rings, thereby further reducing the H—C ratio. In addition, hydrocarbon derivatives, as well as true hydrocarbons, might be and ordinarily would be present. Sulphur, oxygen, and/or nitrogen might be present as substituted or added substances.

In just what form compounds containing sulphur, oxygen, and/or nitrogen exist is a debatable subject. How they exist in such complex mixtures is difficult to determine, but that they do exist has been demonstrated. There is evidence of a certain few types. It is generally conceded that petroleums may contain free sulphur, and that the substances ordinarily referred to as asphalts contain oxygen. There is good evidence of the presence of sulphur in the form of mercaptans. Similarly, there is evidence of the existence of other recognized types, but in general such substances are so complex and so difficult to isolate that the usual standard of analysis are percentages, fractions of or ratios each to another of hydrogen, carbon, nitrogen, oxygen and sulphur. Other elements, if present, may usually be considered as of negligible importance.

The term "hydrogen-carbon ratio" ("H—C"), is used herein as designating the relative proportions of hydrogen to carbon. For instance, hexane of the formula $C_6H_{14}$ has a hydrogen-carbon ratio of 14/6; cyclohexane, $C_6H_{12}$ an H—C ratio of 12/6; benzene $C_6H_6$, an H—C ratio of 6/6. An equimolar mixture of the three would then have 14 hydrogens from the first, (hexane), 12 from the second, (cyclohexane), and six from the third, (benzene), or in all 32 hydrogens. It would have six carbons from each of the three, 18 in all, and the resultant H—C ratio would be 32/18. In such a manner we may give an H—C ratio to any mixture, the only prerequisite being determination of the hydrogen and the carbon contained in a quantity of the material.

As to the characteristics of the various components in such mixtures, complexity again compels the use of general terms. Such being the case, it may be said that in general, (a) Paraffins ($CnH_{2n+2}$) (the subscript "$n$" denoting any definite number) solidify at a higher temperature than do other hydrocarbons of the same volatility.

(b) The greater the H—C ratio, the less will the fluidity of a hydrocarbon mixture be affected by variations in temperature.

(c) The lower the H—C ratio, the more subject is the material to addition reactions, such as the addition of oxygen.

(d) While it is not unusual to encounter in crude petroleum, compounds possessing double or triple bonds (unsaturated compounds), multiple bonds are often produced in refining by thermal decomposition, which substances may more easily form oxygen-containing substances than do analogous compounds containing no multiple bonds. Furthermore, compounds with multiple bonds may be involved in chemical reactions, with or without oxygen, which result in the formation of gummy substances deleterious to commercial products, such as lubricating oil. Unsaturated compounds are more soluble in certain known solvents than are analogous saturated compounds.

(e) Compounds containing oxygen are frequently dark in color and by their presence give a darker color to the mixture in which they exist. Certain dark colored compounds undoubtedly are deleterious in petroleum mixtures when used for certain purposes, and in such instances light color may be considered an indication of the absence of such compounds. Ordinarily light colored oils are more salable than dark.

(f) The presence of sulphur in certain forms, one of which appears to be free sulphur, is likely to produce corrosion of certain metals. In certain other forms the undesirability of sulphur may be questionable. There is, however, such a generally widespread conviction that it is harmful so as to make its presence a decided detriment to the sale of such material. In general, sulphur compounds are easily soluble in certain known solvents.

(g) As to nitrogen, little is known. Presumably, compounds containing nitrogen will give a darker color to a petroleum product. There is evidence that such compounds are relatively very soluble in certain known solvents.

I have discovered that the greater the H—C ratio the lower will be the solubility in certain organic solvents, such as unsaturated aldehydes and ketones such as crotonaldehyde, acrolein, and their isomers, which are included in the group of unsaturated aldehydes characterized in that a multiple bond of the unsaturated compound occurs in a straight aliphatic chain and which are selectively absorptive by solvent action of hydrocarbons of low hydrogen-carbon ratio and such hydrogen-carbon derivatives as are soluble therein.

In the light of the above it is evident that if a hydrocarbon mixture may be made richer in certain members and more lean in others, that it may be improved in value for certain uses and/or rendered more salable. For example, a characteristic midcontinent lubricating oil cut, produced by distillation at a temperature in excess of 700-degrees Fahrenheit, from petroleum such as produced in Kansas or Oklahoma, will contain waxes which, if present in too great a percentage, in finished lubricating oil, will cause the oil to solidify at temperatures well above the minimum temperature of use. Obviously, such a condition is detrimental if it is desired that the oil circulate freely. It may also contain sulphur containing compounds the objections to which have been mentioned and/or similarly oxygen and/or nitrogen containing compounds. Unsaturated hydrocarbons will have been produced due to the high temperature of distillation, but of as much significance as any of these is the fact that while the bulk of the oil may consist of hydrocarbons presumably saturated, these compounds will vary in H—C ratio and consequently in change of fluidity with change of temperature. The lower H—C ratio constituents will by their presence make the fluidity of the mixture more sensitive to temperature changes, and if a portion of these can be removed from the mixture as a whole, the resulting product will be less sensitive and more nearly approach an ideal lubricating oil, which would be one unaffected by temperature fluctuations.

For many uses, a Pennsylvania oil of high H—C ratio is considered the finest available. It is, however, limited seriously in supply, whereas midcontinent petroleum, which is plentiful, can be made more nearly like Pennsylvania oil by the removal of the components the more sensitive to temperature change and/or the removal of hydrocarbon derivatives in the manner above described. Similarly, even the Pennsylvania oil may contain constituents more sensitive than its average. In such case removal of the sensitive constituents should improve the oil.

The present process contemplates the use of media for the separation of certain of the less desirable constituents from a complex mixture by employing as a solvent unsaturated aldehydes or ketones possessing sufficiently high volatility as to be removed and/or reclaimed by distillation. Of this group of solvents I find that crotonaldehyde ($C_3H_5.CHO$) and acrolein ($CH_2:CH.CHO$) and their isomers are particularly effective in dissolving from the basic material, or mixture, certain of the lower H—C ratio hydrocarbons and certain of their derivatives. A high degree of purity of the solvent is found to be generally unnecessary. The solvent may be diluted with water, solvent naphtha, acetone, and/or other organic solvents and still be useful. In fact, for certain mixtures, such dilution may be desirable, since the minor changes thus effected may produce a solvent power better suited to the nature of the material to be fractionated.

The mixture of the basic material and the solvent when subjected to suitable conditions, such as temperature, oil-solvent ratio, will be resolved to produce two separable solutions which may be termed "oil phase" and "solvent phase" solutions. The oil phase may be separated from the solvent phase by decantation, centrifugal separation, or otherwise. The solvent may then be recovered from the oil phase by distillation, thereby producing a raffinate which is itself a valuable lubricating oil, or which if desired may be further refined by reduction of the paraffin wax therein contained. The solvent may also be recovered from the solvent phase by distillation leaving an extract containing impurities which while detrimental to lubricating oil, and other commercial oil products, is itself valuable as a fuel oil and which may contain ingredients which when recovered therefrom are of considerable commercial value.

It is reasonable to assume that all compounds contained in the basic material, such as petroleum, are somewhat soluble in this class of solvents, but that they vary in degree of solubility. It is not unreasonable to assume that no two compounds are soluble to exactly the same degree, whether such compound belongs to one class of compounds or to another. There may be, to be sure, many that as far as experimental determinations are concerned will appear to be identical in solubility characteristics. In other words, they check within possible experimental accuracy. In view of these facts, we will hereafter refer to groups of compounds of which the solubility will be an average for the group.

Furthermore, solubility is a function of temperature, in general increasing with increasing temperature. As heretofore stated, I have discovered and I have experimentally determined that compounds or groups of compounds high in H—C ratio are much less soluble than compounds of relatively low H—C ratio, and that substances intermediate in H—C ratio will also be intermediate in solubility. Furthermore, I have discovered and have experimentally determined that unsaturated compounds, and in general, such hydrocarbon derivatives as are commonly encountered in commercial mixtures may be considered as being of relatively high solubility.

I have further discovered that hydrocarbons of low H—C ratio and hydrocarbon derivatives of the character above mentioned are satisfactorily soluble in unsaturated aldehydes of the group or class above described, at non-freezing temperatures, and that such unsaturated aldehydes, and their isomers, are not of such volatility as to require maintenance of pressure above atmospheric upon the mixture to maintain the solvent in a liquid state.

The significance of the facts above stated, upon which the present invention is based, may be illustrated by a procedure where the main object is to secure a lubricating oil, neglecting the fact that certain other materials of value could also be manufactured from the same raw material, as above suggested.

For purposes of illustration groups of compounds will be referred to instead of specific compounds. Assuming that the raw material, a distillation cut from petroleum which may be either a distillate or a petroleum, is of proper viscosity and volatility range for lubricating oil and that it contains the following groups:—

Group I

Paraffins, (or petroleum waxes), the H—C ratio thereof being slightly greater than 2.

Under conditions which may be designated as No. 1 of temperature, oil-solvent ratio, etc., being soluble to the extent of .1 gram per 100 grams of a solvent of the crotonaldehyde type.

Under conditions which may be designated as No. 2, with the temperature greater than in condition No. 1, being soluble to the extent of 2 grams per 100 grams of solvent.

Such compounds as constitute Group I will be solid at normal temperatures, and also will cause a mixture in which they are present in high concentration to be solid.

Group II

A group of highly desirable lubricating components of H—C ratio somewhat less than 2 being soluble under conditions No. 1 to the extent of 3 grams per 100 grams of solvent, and under conditions No. 2 to the extent of 75 grams per 100 grams.

Group III

Containing unsaturated compounds, compounds of relatively low H-C ratio, compounds containing oxygen, nitrogen, and/or sulphur. This may be defined as a generally undesirable group soluble for purposes of illustration, to the extent of 50 grams per 100 grams of solvent under conditions No. 1 and completely miscible with the solvent under conditions No. 2.

Assuming that the raw material contains 25 grams of Group I, 55 grams of Group II, and 20 grams of Group III, and that under conditions No. 1, 100 grams of such raw material is mixed with 40 grams of solvent, all of Group III, (or 40×50/100 grams equals 20) will be dissolved. There will also be dissolved 40×3/100 grams of Group II, or 1.2 grams, and also 40×.1/100 or .04 grams of Group I.

If now we separate the solvent-phase and the oil-phase above described, and remove the solvent from both phases, the resultant fraction compared with the original material is as follows:— (The term "raffinate" being used to designate the product resulting from the removal of the solvent from the oil-phase, and the term "extract" being used to designate the material dissolved in the solvent-phase).

| Raw material | Raffinate | Extract |
|---|---|---|
| Group I 25 gr | 24.96 gr. | .04 gr. |
| Group II 55 gr | 53.8 gr. | 1.2 gr. |
| Group III 20 gr | 0. | 20 gr. |

The raffinate is now much richer in Groups I and II than was the original material, while the extract is much richer in Group III. If there now be added to the raffinate 72 grams of solvent, and the proper changes in temperature made to produce condition No. 2, this quantity of solvent will be sufficient to dissolve all of the 53.8 grams of Group II in the first raffinate. It will also dissolve 72×2/100 grams or 1.44 grams of Group I.

Separating and removing the solvent as before, two new fractions will be produced as follows:—

| | Raffinate | Extract |
|---|---|---|
| Group I | 23.52 gr. | 1.44 gr. |
| Group II | 0 | 53.8 gr. |
| Group III | 0 | 0 |

The original material will, therefore, have been divided into three fractions, one containing the major portion of Group I, another the major portion of Group II, and the third containing all of Group III with small portions of Groups I and II. All of these fractions are much more nearly pure in regard to certain groups than was the original material.

It is to be understood that the above is purely illustrative and that so far as known it is not possible completely to dissolve under conditions No. 1 all of Group III, or in step 2 all of Group II. There are certain factors of minor importance that render such conditions theoretically impossible. Furthermore, no allowance has been made for such solvent as will be dissolved in the oil-phase. Approximations may be made to a degree sufficient to obtain fractions which are very much more concentrated with respect to certain classes of compounds, as typically illustrated above.

The foregoing example is illustrative of the results of the process forming the subject matter of my invention. The process may be defined as comprising essentially the following steps:

(1) Mixing the solvent with the material to be fractionated under proper conditions of temperature, oil-solvent ratio, and possibly other factors.

(2) After proper mixing of the solvent with the material, the separation of the oil-phase and solvent-phase by decantation, centrifugal force, or otherwise.

(3) Removal of the solvent from each phase by distillation, or otherwise.

With solvents of the type above mentioned, both phases will contain some solvent. The present process may be considered as a two-solution system in which the material to be fractionated may be dissolved in the solvent and/or the solvent dissolved in the material to be fractionated.

(4) In many cases it will be desirable to subject the material to successive treatments or extractions. Such a procedure may be desirable for either or both of two reasons. First, to obtain a more complete extraction of a certain class of compounds, and, second, to extract a different type of material. Such successive extractions may be made under essentially similar conditions of temperature, or at different temperatures. Approximately the effect of repeated treatments may be often secured by some form of countercurrent flow of materials, thereby saving time, equipment and expense as well as making more efficient use of the solvent power of the solvents.

It will be apparent from the foregoing that the present process comprises the fractionation of materials containing mixtures of hydrocarbons and/or hydrocarbon derivatives which comprises mixing with the material an unsaturated aldehyde, or its isomers, to effect by solution of certain members a separation of the dissolved material from the original mixture, which, in the treatment of petroleum, produces a separation of the material into an oil-phase and a solvent-phase. Such separation may, in many instances, be made at ordinary temperatures, while in others it may be desirable to heat or cool the mixture to a predetermined temperature, for example, ten or twenty degrees C., to effect such initial separation of the oil-phase and solvent-phase. Where under either condition such separation is effected, the specific gravities of the oil-phase and the solvent-phase are sufficiently different to enable one of these phases to be removed from the other by decantation, by centrifugal force, or otherwise.

By reason of the capability of unsaturated aldehydes, or its isomers, to dissolve certain of the darker colored constituents, of a basic material, such as a petroleum cut, the present process will produce a raffinate which will be of lighter color, and consequently of greater salability.

In some instances it may be desirable, in order to effect separation of the oil-phase and solvent-phase, to add to the mixture a solvent of greater or less specific gravity which is soluble in one phase and relatively insoluble in the other phase. Such supplementary solvent, as water, may be added to increase the specific gravity of the solvent phase, or acetone may be added to decrease the specific gravity of the solvent phase, or petroleum ether may be added to decrease the specific gravity of the oil-phase.

The use of such supplementary solvents is limited to such cases where an adverse effect will not be had upon the solvent power of the active solvent.

By the use of an unsaturated aldehyde, or its isomers, as a solvent, solution is effected of hydrocarbons of relatively low H—C ratio, also of hydrocarbon derivatives containing sulphur, also hydrocarbon derivatives containing oxygen and/or nitrogen, the presence of these materials being undesirable in lubricating oils.

The resultant separation, therefore, provides an oil solution from which the solvent may be removed to produce a lubricating oil of greater purity than the original mixture. Such oil may be further refined by mixture with the same solvent, preferably an unsaturated aldehyde or its isomers, at a different temperature, or by other suitable solvent, such as acetone, or ethylene dichloride, at a suitable temperature, to separate the paraffin waxes from the oil, thereby producing a lubricating oil of greater fluidity at lower temperatures. Such separation, which in turn may be a two-solution separation of the character above described, will produce paraffin in the raffinate which may be recovered and sold commercially.

By thus removing the paraffin waxes from the oil a product is produced which will solidify at a lower temperature, whereas by the removal of certain low H—C ratio hydrocarbons and/or hydrocarbon derivatives, a lubricating oil is secured lighter in color, lower in specific gravity, and less likely to form gums, oxidize, and/or emulsify with water.

Its fluidity, due to the removal of certain less desirable compounds, will be less affected by temperature. It will be lower in sulphur, and in short will more nearly approach the oil generally considered the ideal lubricating oil.

The material dissolved in the solvent-phase produced in the first step of the process, will be a much more concentrated mixture of unsaturated compounds, low H—C compounds, hydrocarbon derivatives, etc. Generally, it is darker in color, more easily affected by temperatures, more easily subject to the action of certain chemicals, more subject to oxidation and polymerization than was the original material, and at present has little use other than as fuel or a low grade lubricant. However, because of its greater purity, with respect to certain groups of compounds, it is not unlikely that new uses for it may eventually develop.

The steps in the process above described may be performed manually by mixing the solvent into the original material in any suitable container, and in any usual manner, and separation by decantation, such as siphoning, may be employed, as the specific gravities of the oil-phase and solvent-phase may be made sufficiently different to enable such separation to be accomplished easily.

In the commercial use of the process, suitable mixing machines, or devices and separating mechanisms, such as centrifugal separators, may be employed.

It will, therefore, be understood that the invention is not dependent upon any particular mechanisms, but relates to the solvent employed and the steps in the process for obtaining the results herein described.

It will further be understood that whereas croton-aldehyde and acrolein have been described herein as the solvents which preferably are employed in the performance of the process, any other unsaturated aldehyde, or its isomers, capable of producing the results herein described may be employed in the performance of the process.

Having thus described the invention, what is claimed as new, and desired to be secured by Letters Patent, is:

1. The process of fractionating a material containing mixtures of hydrocarbons, and which is of a proper viscosity and volatility range for a lubricating oil, which comprises mixing with said material an unsaturated aldehyde, or its isomer, selected from the group of unsaturated aldehydes, and their isomers, which includes crotonaldehyde and acrolein which are characterized in that a multiple bond of the unsaturated compound occurs in an aliphatic chain and which are selectively absorptive by solvent action of hydrocarbons of relatively low hydrogen-carbon ratio, while maintaining the conditions of temperature and solvent concentration with respect to the hydrogen-carbon ratio and volatility characteristics of the material being treated such that separation into an oil phase and a solvent phase will be effected.

2. The process of fractionating a material containing mixtures of hydrocarbons and hydrocarbon derivatives containing oxygen, nitrogen, and sulphur, which consists in mixing with said material an unsaturated aldehyde, or its isomer, selected from the group of unsaturated aldehydes and their isomers which includes crotonaldehyde and acrolein, and which are characterized in that a multiple bond of the unsaturated compound occurs in an aliphatic chain and which are selectively absorptive by solvent action of hydrocarbons of relatively low hydrogen-carbon ratio and such of said hydrocarbon derivatives as are soluble therein, while maintaining the conditions of temperature and solvent concentration with respect to the hydrogen-carbon ratio and volatility characteristics of the material being treated such that separation into an oil phase and a solvent phase will be effected, and thereafter separating the solvent containing the dissolved constituents from the hydrocarbons of relatively high hydrogen-carbon ratio.

3. The process of fractionating an oleaginous material of the petroleum type containing hydrocarbons and hydrocarbon derivatives which comprises mixing with said material an unsaturated aldehyde selected from the group of unsaturated aldehydes and their isomers which includes crotonaldehyde and acrolein, and which are characterized in that a multiple bond of the unsaturated compound occurs in an aliphatic chain, and which are selectively absorptive by solvent action of hydrocarbons of relatively low hydrogen-carbon ratio and such hydrocarbon derivatives as are soluble therein, while maintaining the conditions of temperature and solvent concentration with respect to the hydrogen-carbon ratio and volatility characteristics of the material being treated such that separation into an oil phase and a solvent phase will be effected, removing one of said phases, thereafter removing by distillation such solvent as is dissolved in the oil phase, and also removing by distillation the solvent in the solvent phase.

4. The process of fractionating an oleaginous material of the petroleum type containing hydrocarbons and hydrocarbon derivatives which comprises mixing with said material an unsaturated aldehyde selected from the group of unsaturated aldehydes and their isomers which includes crotonaldehyde and acrolein, and which are characterized in that a multiple bond of the unsaturated compound occurs in an aliphatic chain and which are selectively absorptive by solvent action of hydrocarbons of relatively low hydrogen-carbon ratio, and such hydrocarbon derivatives as are soluble therein at normal atmospheric temperatures, in sufficient solvent concentration with respect to the hydrogen-carbon ratio and volatility characteristics of the material being treated as to effect a separation of said material into an oil phase and a distinct solvent phase containing such dissolved constituents, removing one of said phases, and thereafter removing by distillation the solvent from the oil phase leaving a raffinate of relatively greater purity and utility than the original material, and also removing the solvent from the solvent phase leaving a commercially useful extract.

5. The process of fractionating a petroleum distillate of proper viscosity and volatility range for a lubricating oil which comprises adding to said distillate an unsaturated aldehyde selected from the group of unsaturated aldehydes and their isomers which includes crotonaldehyde and acrolein, in amount sufficient first to saturate the petroleum distillate, second, to form a distinct solvent phase containing the dissolved constituents, while maintaining the conditions of temperature and solvent concentration with respect to the hydrogen-carbon ratio and volatility characteristics of the material being treated such that separation into an oil phase and a solvent phase will be effected, separating said phases, and thereafter removing by distillation any dissolved solvent from the oil phase leaving a lubricating oil having more desirable characteristics and greater utility than the original material, and also removing the solvent from the solvent phase leaving a commercially useful extract.

6. The process of fractionating a petroleum residuum of proper viscosity and volatility range for a lubricating oil which comprises adding to said residuum an unsaturated aldehye or its isomer selected from the group of unsaturated aldehydes and their isomers which includes crotonaldehyde and acrolein in excess of the amount sufficient to saturate said residuum, while maintaining the conditions of temperature and solvent concentration with respect to the hydrogen-carbon ratio and volatility characteristics of the material being treated such as to insure separation into an oil phase and a solvent phase, containing the dissolved constituents of said residuum, separating said phases and thereafter removing by distillation the solvent dissolved in the oil phase, leaving a lubricating oil having more desirable characteristics and greater utility than the original material, and also removing the solvent from the solvent phase leaving a commercially useful extract.

7. The process of fractionating a petroleum distillate of proper viscosity and volatility range for a lubricating oil which comprises mixing with said distillate an unsaturated aldehyde or its isomer selected from the group of unsaturated aldehydes and their isomers which includes crotonaldehyde and acrolein, and which are characterized in that a multiple bond of the unsaturated compound occurs in an aliphatic chain and which are selectively absorptive by solvent action of hydrocarbons of low hydrogen-carbon ratio and hydrocarbon derivatives in excess of the amount sufficient to saturate said distillate, while maintaining the solvent concentration with respect to the hydrogen-carbon ratio and volatility characteristics of the material being treated such as to effect a separation of the material into an oil phase and a distinct solvent phase containing such constituents as are dissolved therein, separating said phases, further refining the oil phase by mixing the same solvent therewith in sufficient amount and at such temperature as will cause said solvent to absorb by solution hydrocarbons and hydrocarbon derivatives of somewhat higher average hydrogen-carbon ratio, separating the oil from the dissolved constituents and removing by distillation any dissolved solvent from the oil.

8. The process of fractionating a petroleum residuum of proper viscosity and volatility range for a lubricating oil which comprises mixing with said residuum an unsaturated aldehyde or its isomer selected from the group of unsaturated aldehydes and their isomers which includes crotonaldehyde and acrolein, and which are characterized in that a multiple bond of the unsaturated compound occurs in an aliphatic chain and which are selectively absorptive by solvent action of hydrocarbons of low hydrogen-carbon ratio and hydrocarbon derivatives, in excess of the amount sufficient to saturate said residuum, while maintaining the solvent concentration with respect to the hydrogen-carbon ratio and volatility characteristics of the material being treated such as to form an oil phase and a distinct solvent phase containing such constituents as are dissolved therein, separating said phases at normal atmospheric temperatures, further refining the oil phase by mixing the same solvent therewith in sufficient amount and at such temperature as will cause the solvent to absorb by solution hydrocarbons and hydrocarbon derivatives of somewhat higher average hydrogen-carbon ratio, separating the oil from the dissolved constituents and removing by distillation any dissolved solvent from the oil, and also removing the solvent from the solvent phase leaving a commercially useful extract.

9. The process of fractionating a material containing mixtures of hydrocarbons and hydrocarbon derivatives which comprises mixing with said material crotonaldehyde in excess of the amount sufficient to dissolve such materials of the mixture as are soluble therein while maintaining the conditions of temperature and solvent concentration with respect to the hydrogen-carbon ratio and volatility characteristics of the material being treated such that separation into an oil phase and a solvent phase will be effected, removing one of said phases, and thereafter removing the solvent from the oil phase to produce a raffinate of relatively greater purity and utility than the original material.

10. The process of fractionating a material containing mixtures of hydrocarbons and hydrocarbon derivatives which comprises mixing with said material crotonaldehyde in excess of the amount sufficient to dissolve such materials of the mixture as are soluble therein while maintaining the conditions of temperature and solvent concentration with respect to the hydrogen-carbon ratio and volatility characteristics of the material being treated such that separation into an oil phase and a solvent phase will be effected, separating said phases, and thereafter removing the solvent from the oil phase leaving a lubricating oil having more desirable characteristics and of greater utility than the original material, and also removing the solvent from the solvent phase leaving a commercially useful extract.

11. The process of fractionating a petroleum distillate of proper viscosity and volatility range for a lubricating oil which comprises mixing with said distillate crotonaldehyde in excess of the amount sufficient to saturate said distillate while maintaining the conditions of temperature and solvent concentration with respect to the hydrogen-carbon ratio and volatility characteristics of the distillate being treated such as to effect separation into an oil phase and a distinct solvent phase containing such constituents as are dissolved therein, separating said phases, and thereafter removing the solvent from the oil phase leaving a lubricating oil having more desirable characteristics and of greater utility than the original material, and also removing the solvent from the solvent phase leaving a commercially useful extract.

12. The process of fractionating a petroleum residuum of proper viscosity and volatility range for a lubricating oil which comprises mixing with said residuum crotonaldehyde in excess of the amount sufficient to saturate said residuum while maintaining the conditions of temperature and solvent concentration with respect to the hydrogen-carbon ratio and volatility characteristics of the residuum being treated, such as to effect separation into an oil phase and a distinct solvent phase containing such constituents as are dissolved therein, separating said phases, and thereafter removing the solvent from the oil phase leaving a lubricating oil having more desirable characteristics and of greater utility than the original material, and also removing the solvent from the solvent phase leaving a commercially useful extract.

13. The process of fractionating a material containing mixtures of hydrocarbons and hydrocarbon derivatives which comprises mixing with said material acrolein in excess of the amount sufficient to dissolve such materials of the mixture as are soluble therein, while maintaining the conditions of temperature and solvent concentration with respect to the hydrogen-carbon ratio and volatility characteristics of the material being treated such that separation into an oil phase and a solvent phase will be effected, removing one of said phases, and thereafter distilling the solvent from the oil phase to produce a raffinate of relatively greater purity and utility than the original material, and also removing the solvent from the solvent phase leaving a commercially useful extract.

14. The process of fractionating a petroleum distillate of proper viscosity and volatility range for a lubricating oil which comprises mixing with said distillate acrolein in excess of the amount sufficient to dissolve the hydrocarbons of relatively low hydrogen-carbon ratio and such hydrocarbon derivatives as are soluble therein, while maintaining the conditions of temperature and solvent concentration with respect to the hydrogen-carbon ratio and volatility characteristics of the material being treated such that separation into an oil phase and a solvent phase will be effected, thereafter removing by distillation the solvent from the oil phase and leaving a lubricating oil having more desirable characteristics and of greater utility than the original material, and also removing the solvent from the solvent phase leaving a commercially useful extract.

15. The process of fractionating a petroleum residuum of proper viscosity and volatility range for a lubricating oil which comprises mixing with said residuum acrolein in excess of the amount sufficient to dissolve the hydrocarbons of relatively low hydrogen-carbon ratio and such hydrocarbon derivatives as are soluble therein, while maintaining the conditions of temperature and solvent concentration with respect to the hydrogen-carbon ratio and volatility characteristics of the material being treated such that separation into an oil phase and a solvent phase will be effected, and thereafter removing by distillation the solvent from the oil phase and leaving a lubricating oil having more desirable characteristics and of greater utility than the original material, and also removing the solvent from the solvent phase having a commercially useful extract.

JOHN WARD POOLE.